United States Patent Office 2,837,521
Patented June 3, 1958

2,837,521

METHOD FOR MAKING POLYAZAINDENES

Donald M. Burness, Rochester, N. Y., assignor to Eastman Kodak Company, Rochester, N. Y., a corporation of New Jersey No Drawing. Application April 11, 1956
Serial No. 577,457

11 Claims. (Cl. 260—256.4)

This invention relates to an improved method for making polyazaindenes, many of which can be advantageously used to stabilize photographic silver halide emulsions against the formation of spontaneous fog and to prevent or inhibit loss of speed on keeping the emulsions at elevated temperatures and humidities.

It is known that certain polyazaindene compounds can be prepared by condensing together various aminotriazole compounds and $\beta$-ketoesters. (See, for example, Birr—"Zeit. Wiss. Photo. Photophysik Photochemie," vol. 47 (1952), pages 2–28).

I have found a new and improved process for making polyazaindenes, many of which have not been heretofore described in the art.

It is, therefore, an object of my invention to provide an improved method for making polyazaindene compounds. Another object is to provide a method for making tetrazaindene compounds. Still another object is to provide new compounds which are useful in the photographic art. Other objects will become apparent from a consideration of the following description and examples.

According to my invention, I provide polyazaindene compounds by condensing together $\beta$-ketoacetals and polyazole compounds having at least one primary amino group attached to the polyazole ring.

The $\beta$-ketoacetals useful in practicing my invention can advantageously be represented by the following formula:

I.
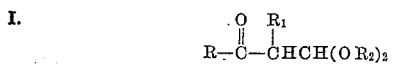

wherein R represents an alkyl group, such as methyl, ethyl, n-propyl, isopropyl, n-butyl, isobutyl, benzyl (phenylmethyl), $\beta$-phenylethyl, etc. or an aromatic group, such as phenyl, o-, m-, and p-tolyl, naphthyl, etc. (e. g., a mononuclear aromatic group of the benzene series), $R_1$ represents a hydrogen atom, an alkyl group (e. g., methyl, ethyl, n-propyl, isopropyl, n-butyl, isobutyl, benzyl, $\beta$-phenylethyl, etc.), or an aromatic group (e. g., phenyl, o-, m-, and p-tolyl, etc.), R and $R_1$ can together represent the atoms necessary to complete a carbocyclic nucleus (e. g., cyclopentanone, cyclohexanone, etc.), and $R_2$ represents an alkyl group, such as methyl, ethyl, n-propyl, isopropyl, isobutyl, n-butyl, etc. or an aromatic group, such as phenyl, o-, m-, and p-tolyl, etc. The $\beta$-ketoacetals of Formula I above can advantageously be prepared by condensing together a compound selected from those of the following general formula:

Ia.

wherein R and $R_1$ have the values given above, with a hydroxy compound of the following formula:

Ib.  

wherein $R_2$ has the value given above, in the presence of a strongly alkaline material, such as sodium hydroxide, potassium hydroxide, etc. to produce the alkali metal derivative of the compounds of Formula Ib, or the said alkali metal compounds can be formed in a separate reaction and be used directly. See also, "Chem. Abs.," vol. 41, col. 704, and vol. 42, col. 5430.

Polyazole compounds useful in practicing my invention include amino-1,2,4-triazoles (e. g., 3-amino-1,2,4-triazole, 3,5-diamino-1,2,4-triazole, 3-amino-5-methylmercapto-1,2,4-triazole, 4-amino-1,2,4-triazole, etc.), amino-1,2,3-triazoles (e. g., 4-amino-1,2,3,-triazole, 5-amino-1,2,3-triazole, etc.), aminotetrazoles (e. g., 5-aminotetrazole, etc.), 2-aminobenzimidazoles (e. g., 2-aminobenzimidazole, 2-amino-5-methylbenzimidazole, etc.), etc. See, for example, U. S. Patent 2,444,608, which illustrates other polyazoles which can be employed in my invention.

I have also found that vinyl ether-ketones represented by the following general formula:

II.  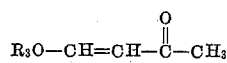

wherein $R_3$ represents an alkyl group (e. g., methyl, ethyl, etc., particularly lower alkyl groups), can replace the $\beta$-ketoacetals of Formula I in the condensations of my invention. The ether-ketones of Formula II can be prepared according to the process of Tanabe in "Jour. Pharm. Soc. Japan," vol. 71 (1951), pages 1349–55.

The condensations of my invention employing amino-1,2,4-triazoles provide tetrazaindenes having the probable ring structure:

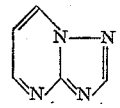

Condensations employing an aminotetrazole provide pentazaindenes having the probable ring structure:

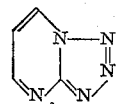

As shown below, such condensations lead to the formation of several possible isomers, depending on the position of the primary amino group, presence or absence of solvents, type of solvent, etc. It is to be understood that my invention contemplates the formation of such isomers, and accordingly, the structures given below are merely illustrative. My invention contemplates all isomers or mixtures resulting from the condensations herein described.

These condensations can be carried out in the presence or absence of solvents, such as xylenes, benzene, acetic acid, N,N-dimethylformamide, etc. Since low boiling alcohols and water are given off in the condensations, improved yields can be obtained by selecting a solvent which boils 25–30° C., or more, higher than the alcohol given off, and the water. Such selection will depend on the nature of the particular reactants, yields desired, and the like.

Heat accelerates the condensations, although temperatures varying from ambient temperature to the reflux temperature of the reaction mixture can be employed. Generally, temperatures of from 25° C. to 150° C. are quite satisfactory.

While isomeric mixtures sometimes result in my condensations, it is not necessary to separate the same into their component compounds, since I have found that these mixtures can also be used to stabilize photographic emulsions, as described in U. S. Patent 2,713,541, issued July 19, 1955.

The following examples will serve to illustrate more fully the manner of practicing my invention.

Example 1.—6-methyl-1,3,3a,7-tetrazaindene

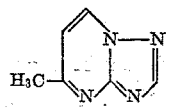

A mixture of 80 g. (0.6 mole) of 4,4-dimethoxy-2-butanone and 42 g. (0.5 mole) of 3-amino-1,2,4-triazole was heated in 750 ml. of xylene under a suitable fractionating column, and the methanol-water distillate was removed as formed. The reaction was continued to completion (about 5 hours), and the resulting solution was treated with decolorizing carbon and filtered. The desired methyltetrazaindene separated from the cooled solution in 78% yield. Purification by recrystallization from benzene produced the pure compound of M. P. 182–183° C. (corr.). Comparison of the infrared spectrum with that of the compound prepared in another way showed them to be identical.

Analysis.—Calcd. for $C_6H_6N_4$: C, 53.7; H, 4.5; N, 41.8. Found: C, 53.7; H, 4.5; N, 42.0.

Example 2.—6-methyl-1,3,3a,7-tetrazaindene

A mixture of 26.4 g. of 4,4-dimethoxy-2-butanone, 16.8 g. of 3-amino-1,2,4-triazole and 250 ml. of benzene was heated as in Example 1 for 2.5 days to produce 15.2 g. (79% crude yield) of the desired methyltetrazaindene.

Example 3.—2-amino-6-methyl-1,3,3a,7-tetrazaindene

A mixture of 9.9 g. of commercial guanazole (3,5-diamino-1,2,4-triazole) and 14.5 g. of 4,4-dimethoxy-2-butanone was heated in 100 ml. of xylene as in Example 1. After four hours the mixture was cooled, the xylene decanted, and the residue extracted with 75 ml. of N,N-dimethylformamide. After a charcoal treatment and purification as in Example 1, 6.6 g. of 2-amino-6-methyl-1,3,3a,7-tetrazaindene were obtained. The pure compound melted at 210–211° C. (corr.).

Analysis.—Calcd. for $C_6H_7N_5$: C, 48.3; H, 4.7; N, 47.0. Found: C, 47.9; H, 5.1; N, 47.3.

Example 4.—6-methyl-1,3,3a,7-tetrazaindene

A solution of 4.2 g. of 3-amino-1,2,4-triazole and 5 g. of 4-methoxy-3-buten-2-one in 25 ml. of N,N-dimethylformamide was allowed to stand at 25° C. for nine days. A product of high purity, M. P. 181–182° C., crystallized from the solution in a 1.5-gram yield.

Example 5.—2 - methylmercapto - 6 - methyl - 1,3,3a,7-tetrazaindene

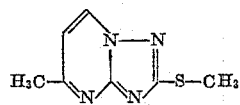

A mixture of 8.0 g. of 4,4-dimethoxy-2-butanone and 6.5 g. of 3-amino-5-methylmercapto-1,2,4-triazole (U. S. 2,566,659) in 100 ml. of xylene was treated as in Example 1. A 65 percent yield of 2-methylmercapto-6-methyl-1,3,3a,7-tetrazaindene (or isomer) was obtained. After recrystallization from xylene, the colorless plates melted at 125–126° C.

Calcd. for $C_7H_8SN_4$: C, 46.7; H, 4.5; N, 31.1. Found: C, 46.6; H, 4.3; N, 31.3.

Example 6.—5-methyl-1,2,3a,4-tetrazaindene

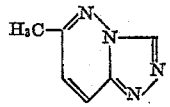

A procedure similar to that of Example 1, but using 4-amino-1,2,4-triazole, produced 5-methyl-1,2,3a,4-tetrazaindene, M. P. 167–168° C.

Example 7.—6-methyl-1,2,3,3a,7-pentazaindene

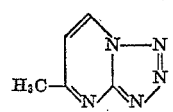

A mixture of 15.5 g. of 4,4-dimethoxy-2-butanone and 8.6 g. of 5-aminotetrazole in a solution of 100 ml. of xylene and 15 ml. of N,N-dimethylformamide was treated as in Example 1 to give a 76 percent yield of the pentazaindene. Recrystallization from ethanol produced nearly colorless crystals of M. P. 134° C.

Calcd. for $C_5H_5N_5$: C, 44.4; H, 3.7; N, 51.8. Found: C, 44.5; H, 3.4; N, 51.3.

Example 8.—6-methyl-1,3,3a,7-tetrazaindene

A mixture of the reactants of Example 1 was heated gently without a solvent until methanol and water ceased to distill. Crystallization of the product from benzene produced a 66 percent yield of compound, M. P. 173–178° C., which proved to be identical to that of Example 1.

Example 9.—2-methyl-1,4a,9-triazafluorene

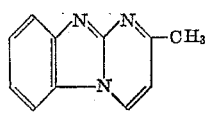

A mixture of 15.8 g. of 4,4-dimethoxy-2-butanone and 13.3 g. of 2-aminobenzimidazole was reacted as in Example 1 to produce 94 percent of the crude triazafluorene. Recrystallization from ethanol yielded long, flat green-yellow rods of M. P. 233° C.

Calcd. for $C_{11}H_9N_3$: C, 72.2; H, 4.9; N, 22.9. Found: C, 71.7; H, 4.8; N, 23.1.

Example 10.—2-amino-6-phenyl-1,3,3a,7-tetrazaindene

A mixture of 13.6 g. of $\beta,\beta$-dimethoxypropiophenone and 5.8 g. of guanazole, heated in 100 ml. of xylene for 10 hours, produced a 95 percent yield of a mixture of isomers from which was isolated by fractional crystallization (from xylene) a pale yellow compound of M. P. 267° C.

Calcd. for $C_{11}H_9N_5$: C, 62.6; H, 4.3; N, 33.1. Found: C, 62.6; H, 4.3; N, 33.6.

Example 11.—Dimethyltetrazaindenes

A mixture of 12 g. of 4,4-dimethoxy-3-methyl-2-butanone and 6.3 g. of 3-amino-1,2,4-triazole was subjected to conditions similar to those of Example 1. From the crude product, obtained in 70 percent yield, were isolated two isomeric dimethyltetrazaindenes:

(1) Colorless needles of M. P. 178° C. from benzene
(2) Colorless, asbestos-like crystals of M. P. 91–99° C. from methylcyclohexane.

Repeated recrystallization failed to improve the melting point of this second isomer.

Calcd. for $C_7H_8N_4$: C, 56.8; H, 5.4; N, 37.8. Found: (1): C, 56.9; H, 5.3; N, 38.1. Found (2): C, 57.2; H, 5.4; N, 37.7.

Example 12.—2-amino-5,6-tetramethylene-1,3,3a,7-tetrazaindene

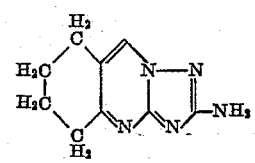

A mixture of 11 g. of 2-(dimethoxymethyl)cyclohexanone and 6.9 g. of guanazole was treated as in Example 7 to produce an apparent mixture of isomers from which was isolated by fractional crystallization (from N,N-dimethylformamide) a nearly colorless product of M. P. 317–318° C.

Calcd. for $C_9H_{11}N_5$: C, 57.1; H, 5.8; N, 37.1. Found: C, 57.3; H, 5.9; N, 37.8.

In a manner similar to that illustrated in the above examples, other polyazaindene compounds can be obtained. By lower alkyl, I mean alkyl containing from 1 to 4 carbon atoms.

By polyazole ring, I mean a ring containing more than one nitrogen atom therein (from 2 to 4, for example) and containing only carbon atoms in addition to the ring nitrogen atoms.

Related polyazaindene compounds which contain a mercapto group (SH) can be further modified by treatment with chloroacetic acid in alkaline solution to produce the corresponding carboxymethylmercapto derivatives. These derivatives have been found to be particularly useful in stabilizing photographic silver halide emulsions as shown in the copending application of Reynolds, Murray and Van Allan Serial No. 567,418, filed February 23, 1956.

The following examples will serve to illustrate the manner of converting polyazaindene compounds containing a mercapto group to the corresponding carboxymethylmercapto compounds.

*Example 13.—3-carboxymethylmercapto-6-hydroxy-4 methyl-1,2,3a,7-tetrazaindene*

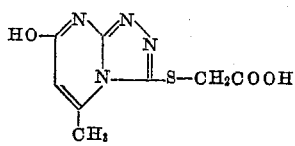

To a solution of 19 g. (0.1 mole) of 3-mercapto-6-hydroxy-4-methyl-1,2,3a,7-tetrazaindene (obtained by reacting 2-hydrazino-4-hydroxy-6-methylpyrimidine together with phenylisothiocyanate) in a solution of 10 g. of sodium hydroxide in 350 ml. of water was added 12 g. of sodium chloroacetate. The solution was heated on the steam bath for 2 hours, filtered, and the filtrate acidified with acetic acid. The white solid was collected on a filter and recrystallized from water to give 17 g. of the desired product melting at 239–241° C.

The product obtained in Example 13 above was dissolved in an inert solvent, such as methanol, ethanol, or acetone, and added to a photographic gelatino-silver-bromiodide emulsion which had been chemically sensitized with sulfur and gold compounds as described in the copending application of Reynolds et al. mentioned above. A portion of the photographic emulsion thus obtained was coated fresh on a transparent support, while the remaining portion was coated on a transparent support and this coating incubated for one week at 120° F. and constant humidity as described in the Reynolds et al. application. The two coatings were then exposed and developed in the usual manner and the speed, gamma and fog for the coatings measured and compared with control coatings which contained no tetrazaindene compound. The following results were obtained:

| Tetrazaindene | g./mol. AgX | Fresh Coating | | |
|---|---|---|---|---|
| | | 30/E Speed | Gamma | Fog |
| Control | | 5,100 | 1.17 | .12 |
| 3 - carboxymethylmercapto - 6 - hydroxy - 4 - methyl-1,2,3a,7-tetrazaindene | .3 | 4,550 | 1.20 | .10 |

| Tetrazaindene | g./mol. AgX | 1 wk. at 120° F. Incubation | | |
|---|---|---|---|---|
| | | 30/E Speed | Gamma | Fog |
| Control | | 3,800 | 1.10 | .24 |
| 3 - carboxymethylmercapto - 6 - hydroxy - 4 - methyl-1,2,3a,7-tetrazaindene | .3 | 4,350 | 1.07 | .13 |

*Example 14.—1-carboxymethylmercapto-5-methyl-2,3,9b-triazabenzo-[g]indene*

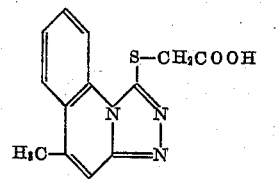

This compound was prepared in exactly the manner shown in Example 13 above by heating together 2 g. of the corresponding mercapto compound with 1.2 g. of sodium chloroacetate. There were obtained 2.2 g. of the desired product melting at 229–30° C.

*Analysis.*—Calc'd. for $C_{13}H_{11}N_3O_2S$: C, 57.2; H, 4.0; N, 15.4; S, 11.7. Found: C, 57.6; H, 4.1; N, 15.2; S, 11.4.

In the same manner indicated above for Example 13, and as more completely described in the Reynolds et al. application mentioned above, the triazabenzoindene compound obtained in Example 14 was incorporated in a gelatino-silver-bromiodide emulsion, and the emulsion coated on a transparent support. Comparison of the resulting coating, both fresh and after incubation, is illustrated below with respect to a corresponding coating containing no antifoggant. The results follow:

| Triazabenzoindene | g./mol. AgX | Fresh Coating | | |
|---|---|---|---|---|
| | | 30/E Speed | Gamma | Fog |
| Control | | 5,450 | .96 | .16 |
| 1 - carboxymethylmercapto - 5 - methyl - 2,3,9b - triazabenzo - [g]indene | .3 | 4,650 | 1.07 | .13 |

| Triazabenzoindene | g./mol. AgX | 1 wk. at 120° F. Incubation | | |
|---|---|---|---|---|
| | | 30/E Speed | Gamma | Fog |
| Control | | 4,350 | .88 | .26 |
| 1 - carboxymethylmercapto - 5 - methyl - 2,3,9b - triazabenzo - [g]indene | .3 | 4,750 | 1.06 | .15 |

What I claim as my invention and desire secured by Letters Patent of the United States is:

1. A process for preparing polyazaindene compounds comprising condensing together a β-ketoacetal selected from those represented by the following two general formulas:

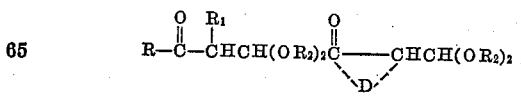

and wherein R represents a member selected from the group consisting of an alkyl group and an aromatic group, $R_1$ represents a member selected from the group consisting of a hydrogen atom, an alkyl group, and an aromatic group, D represents the atoms necessary to complete a carbocyclic nucleus, and $R_2$ represents an alkyl group, with a polyazole having at least one primary amino group attached to the polyazole ring, said polyazole containing from 2 to 4 nitrogen atoms in the polyazole ring.

2. A process for preparing polyazaindene compounds comprising condensing together a β-ketoacetal selected from those represented by the following two general formulas:

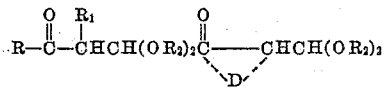

and wherein R represents a member selected from the group consisting of an alkyl group containing from 1 to 8 carbon atoms and a monocyclic aromatic group of the benzene series containing from 6 to 7 carbon atoms, $R_1$ represents a member selected from the group consisting of a hydrogen atom, a lower alkyl group, and a monocyclic aromatic group of the benzene series containing from 6 to 7 carbon atoms, D represents the atoms necessary to complete a nucleus selected from the group consisting of cyclopentane and cyclohexane, and $R_2$ represents a lower alkyl group, with a polyazole selected from the group consisting of an amino-1,2,4-triazole, an aminotetrazole, an amino-1,2,3-triazole, and a 2-aminobenzimidazole.

3. A process according to claim 2 wherein the condensation is carried out in the presence of xylenes.

4. A process for preparing polyazaindene compounds comprising condensing a 4,4-di(lower alkoxy)-2-butanone with an amino-1,2,4-triazole.

5. A process for preparing a polyazaindene compound comprising condensing 4,4-dimethoxy-2-butanone with 3-amino-1,2,4-triazole.

6. A process for preparing a polyazaindene compound comprising condensing 4,4-dimethoxy-2-butanone with 3,5-diamino-1,2,4-triazole.

7. A process for preparing a polyazaindene compound comprising condensing 4,4-dimethoxy-2-butanone with 3-amino-5-methylmercapto-1,2,4-triazole.

8. A process for preparing polyazaindene compounds comprising condensing a 4,4-di(lower alkoxy)-2-butanone with an aminotetrazole.

9. A process for preparing a polyazaindene compound comprising condensing 4,4-dimethoxy-2-butanone with 5-aminotetrazole.

10. A process for preparing polyazaindene compounds comprising condensing a 4,4-di(lower alkoxy)-2-butanone with a 2-aminobenzimidazole.

11. A process for preparing a polyazaindene compound comprising condensing 4,4-dimethoxy-2-butanone with 2-aminobenzimidazole.

References Cited in the file of this patent

UNITED STATES PATENTS

| | | |
|---|---|---|
| 2,553,500 | Harsh | May 15, 1951 |
| 2,566,658 | Fry | Sept. 4, 1951 |

OTHER REFERENCES

Chemical Abstracts, vol. 47, page 2617 (d—e).
Beinstein: vol. 26, page 359 (1953).

UNITED STATES PATENT OFFICE
Certificate of Correction

Patent No. 2,837,521                                              June 3, 1958

Donald M. Burness

It is hereby certified that error appears in the printed specification of the above numbered patent requiring correction and that the said Letters Patent should read as corrected below.

Column 6, line 52, in the table, third column thereof, under the heading "30/E Speed", for "4,350" read —3,450—; same column 6, lines 63 to 67, and column 7, lines 6 to 10, the formula, in each occurrence, should appear as shown below instead of as in the patent—

Signed and sealed this 12th day of August 1958.

[SEAL]

Attest:
KARL H. AXLINE,
*Attesting Officer.*

ROBERT C. WATSON,
*Commissioner of Patents.*